United States Patent Office.

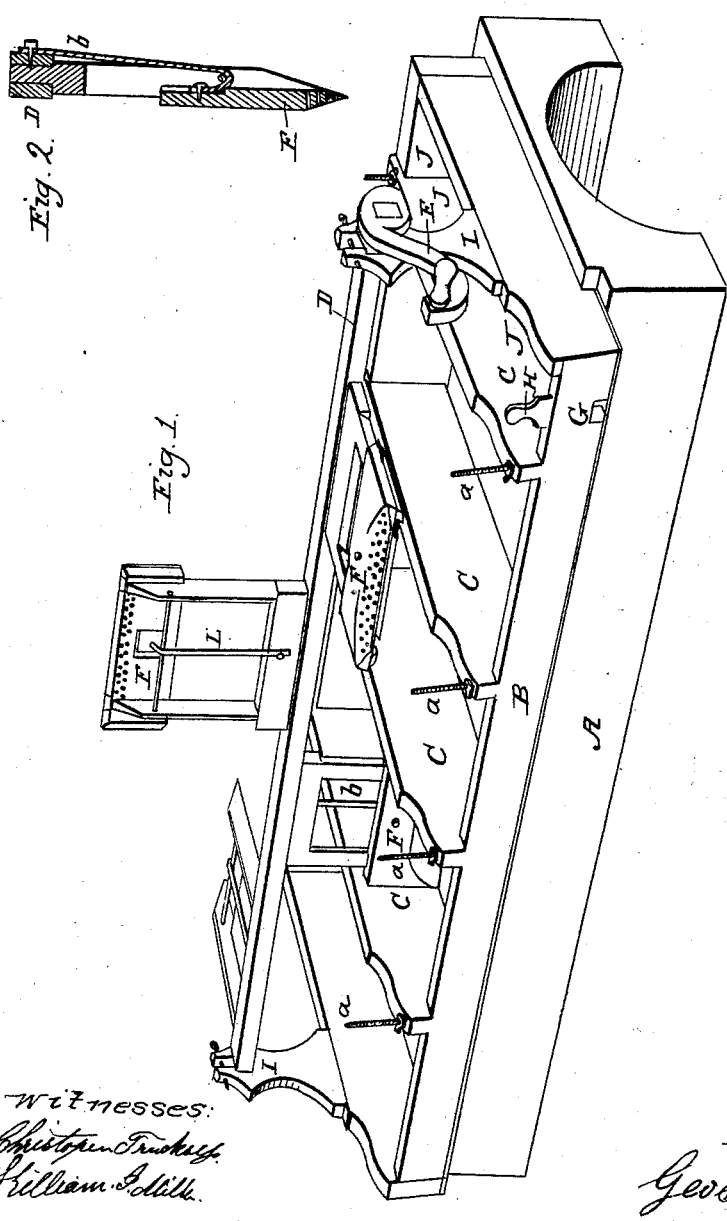

GEO. STEPHENSON, OF ZIONSVILLE, INDIANA.

IMPROVEMENT IN APPARATUS FOR EVAPORATING LIQUIDS.

Specification forming part of Letters Patent No. 28,211, dated May 8, 1860.

*To all whom it may concern:*

Be it known that I, GEO. STEPHENSON, of Zionsville, in the county of Boone and the State of Indiana, have invented a new and useful Improvement in Evaporating-Pans; and I do hereby declare that the following is a full and complete description of the same, reference being had to the accompanying drawings and the letters of reference marked thereon, making a part of this specification.

My improvement consists in the employment of a shaft placed above the evaporating-pan, rotated by hand or by some regular motor, the shaft being furnished with arms and the arms with perforated blades, which are adjustable upon the arms, and which serve both to remove the scum from the surface of the fluid and likewise by reaching to the bottom of the pan, remove by their action the feculent matter which is precipitated in the process of boiling and adheres to the bottom of the pan. The pan is divided by adjustable partitions placed transversely across the pan into any number of spaces, to each of which spaces one pair of arms and one adjustable blade is adapted, except that the pan is provided with one division which extends beyond the part to which the heat is applied, and which serves to allow the sirup or substance which has been evaporated to subside before it is allowed to escape from the pan. These adjustable transverse partitions are supported by upright rods, which are cut with into a screw-thread and provided with nuts. The partitions may be thus raised so as to allow the fluid to flow under them along the bottom of the pan, and may be set and held at any required distance above the bottom of the pan.

In the drawings, Figure 1 is a perspective view of the pan, and Fig. 2 is a section showing the shaft, the arm, and blade, and the elastic spring by which the blade in its rotation adapts itself to and acts upon the bottom of the pan.

Like letters refer to corresponding parts in both drawings.

A is a base upon which the pan rests. If the pan is heated by steam, this may be made of wood, or if by direct fire this base will represent the furnace, which would be made of brick or stone. In this case, in order to preserve the last space from the action of the heat, for the purpose which has been named, the flue should be taken out at one side before it reaches this space; or, if preferable to conduct it through direct, a stratum of brick may be interposed between the bottom of the pan and the current of heated air or flame, thus protecting it from the action of any considerable degree of heat for the space thus insulated.

B represents the pan, which may be made of sheet or cast metal, or of a union of metal and wood.

C represents the adjustable partitions, and *a* the uprights by which they are held in place.

D is the shaft, rotated by the crank E.

F represents the perforated blades or skimmers. These may be made of wood or metal. They are adjusted to work out and in upon the arms to which they are secured, being held outwardly by the elastic strap *b*, which, being secured to a point near the shaft, passes around a cross-piece reaching between the arms, and is then secured to the blade in such a manner as that its contraction causes the blade to slide outwardly toward the ends of the arms. When the shaft is revolved and these blades come in contact with the bottom of the pan, the springs or elastic straps, expanding, permit the blades to slide inwardly upon the arms toward the shaft until they pass the vertical line, when the spring, contracting, causes them to return outwardly, and thus to rotate in contact with the bottom of the pan for a distance equal to the width of the fire-surface, the purpose of this arrangement being to cause the edges of the blades to scrape the bottom of the pan or that part of it which is exposed to direct heat, and thus remove the feculent matter as fast as it is deposited and before it becomes carbonized by the heat.

I represents the upright pieces, firmly secured to the ends of the pan, which afford the bearings in which the shaft D revolves. G is an opening permitting the juice or substance which has been boiled to escape from the last or cooling chamber of the pan, which is designated by J J. The opening and the flow of the fluid is regulated by sliding gate H.

When the apparatus is required for use, it having been adapted to a furnace or to receive its heat from a steam-chamber under the bottom by an arrangement known as a "steam-jacket," the juice or fluid to be boiled is admitted to the pan until the entire bottom is covered to the depth of about one inch. Heat is then applied, either by firing under the pan or by admitting steam to the chamber under it. The fluid will presently boil and begin to throw up its scum. The shaft should then be turned at a moderate speed, just sufficient to keep the fluid in motion and to remove the scum from the top and the sediment from the bottom as fast as they accumulate. In the construction of the apparatus the shaft should be so placed with reference to the side of the pan over which the scum and sediment are discharged by the blades as that the latter will meet the side as it comes out of the fluid, and thus be prevented from discharging the substance with which it is laden until it rises above the side of the pan, when it may be permitted to escape into tubs or a trough-conductor. When the juice or fluid commences boiling upon the first application of heat, a small stream of the same may be permitted to flow from an elevated reservoir into the first division of the pan. (By the first division I mean the one at the opposite end from the cooling-chamber which has been described.) This flow should be observed and regulated from time to time, so that the amount of fluid in the pan may be kept nearly uniform. At the commencement of the process of boiling it will be necessary to draw from the ejection-gate G, which has been described, a portion of fluid to be returned to the upper end of the pan, and this continue to do until the sirup or substance which escapes is of the required density. Then allow it to flow in a stream which will just take off the sirup or substance as fast as it attains the desired density, regulating the supply at the other end of the pan with reference to both the escape and the evaporation, keeping the amount of fluid in the pan nearly uniform.

It will be observed that the purpose of my rotating or automaton skimmer is twofold, that of removing the scum from the top of the pan, and of scraping and bringing up the precipitate from the bottom. This latter function of the skimmer cannot be too highly estimated, since it is from the carbonized fecula that adheres to the bottom of the pan, imparting its burned and bitter taste and its inky hue to the product, that has rendered so many of the experiments with the Northern sugar-canes entirely unsatisfactory. For the simple purpose of removing the scum from the top of the pan, it has important advantages over any of the ordinary modes, for these must be conducted by the operator in the midst of the dense vapor which arises from the pan, and which prevents him from seeing the surface of the fluid; hence the scum is in many instances very imperfectly removed, and when it is remembered that unless the fecula, which comes to the surface entangled in masses of coagulated albumen, is almost instantly removed the masses or flakes presently become disintegrated by the ebullition of the fluid, and thence become almost inextricably involved with it. By my process every part of the pan is visited regularly and successively by the skimmers. The whole work is accomplished by a single operator, who may be a boy, and he is in a position entirely secure or out of the range of the hot and offensive vapor.

I am aware that a variety of rotating devices have been employed in connection with evaporating-pans for the purpose of facilitating evaporation; but their construction, operation, and the object attained by them has been different from that which is accomplished by my invention.

I am also aware that division-bars, variously arranged, have been used. I do not, therefore, claim them as my invention; but, Having described my improved evaporating-pan, what I claim as my invention, and desire to secure by Letters Patent, is—

The rotating shaft D, the adjustable perforated blades or skimmers F, and the springs b, constructed and operating in combination with the partitioned pan B, substantially as described.

In testimony whereof I have hereunto set my hand.

GEO. STEPHENSON.

Witnesses:
CHRISTOPHER TRUCKELS,
WILLIAM J. MILLS.